June 16, 1931.  P. HALLOT  1,810,763
SERVO BRAKE
Filed July 6, 1927   5 Sheets-Sheet 1
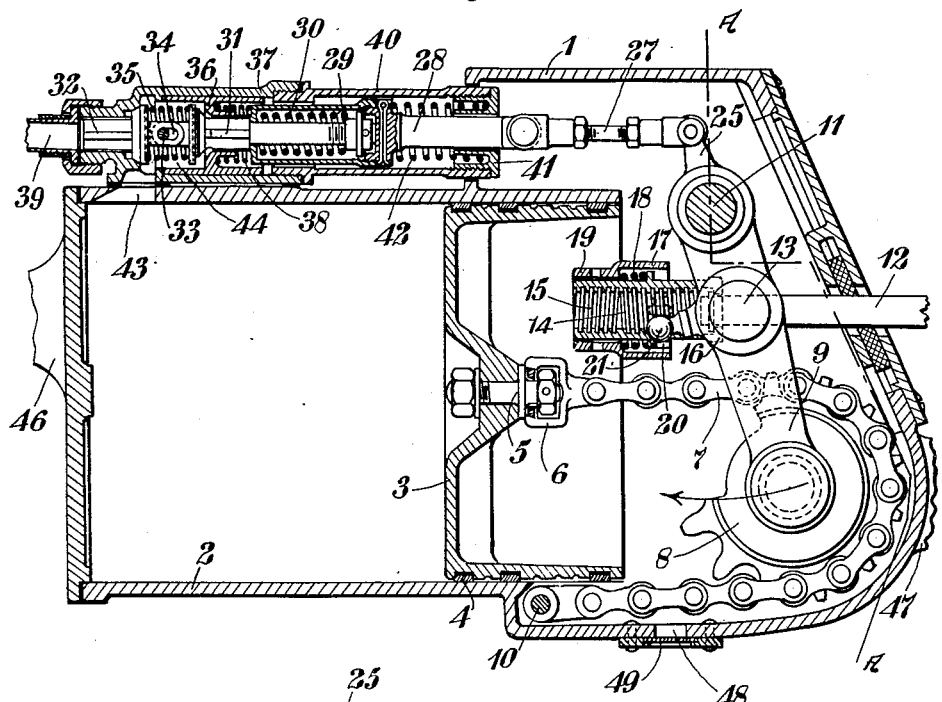
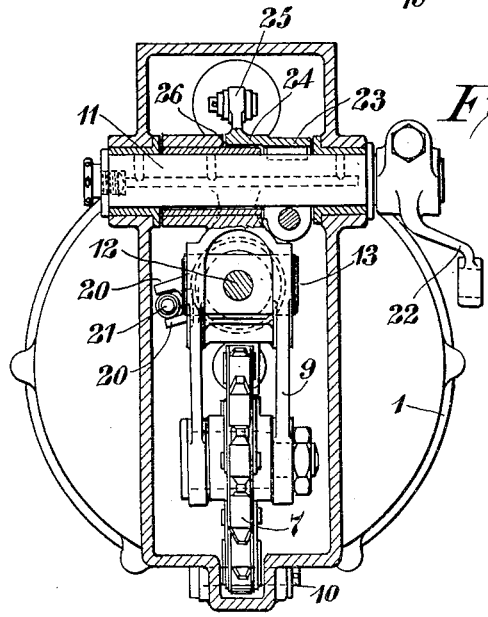
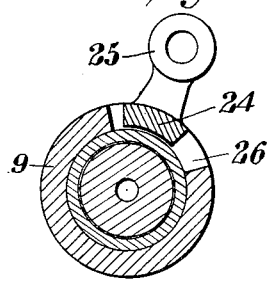
INVENTOR:
Paul Hallot

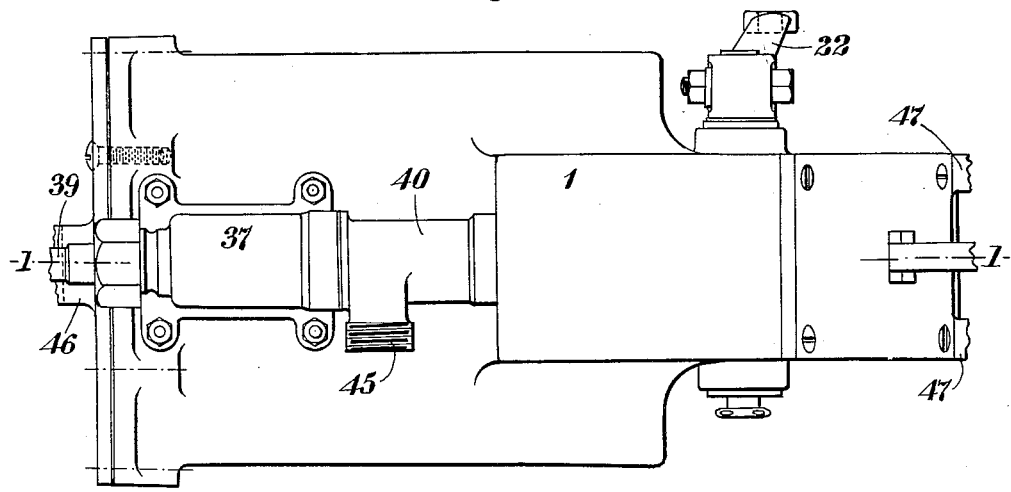
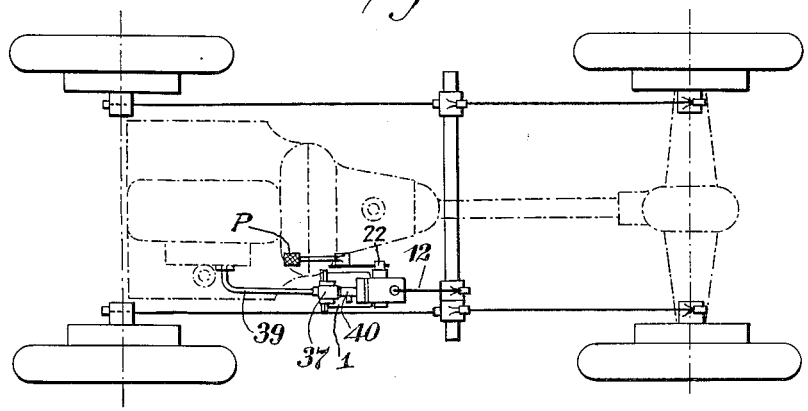

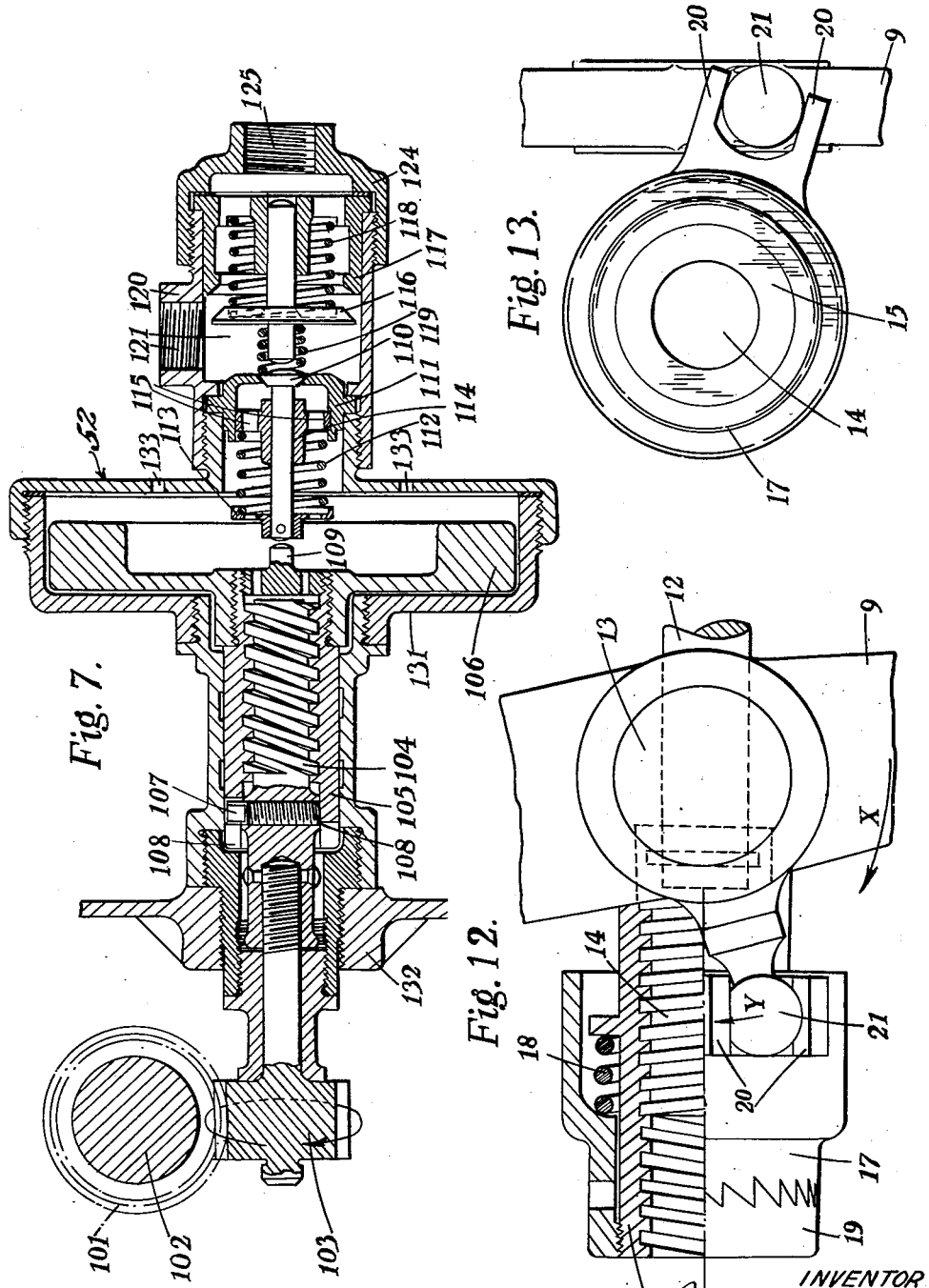

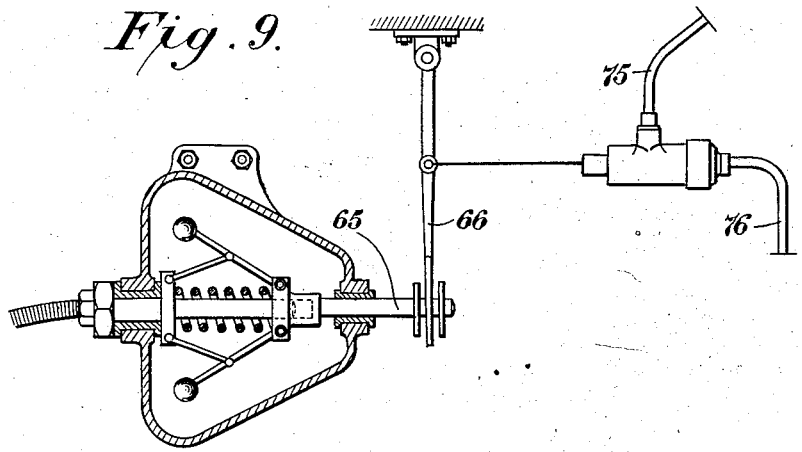
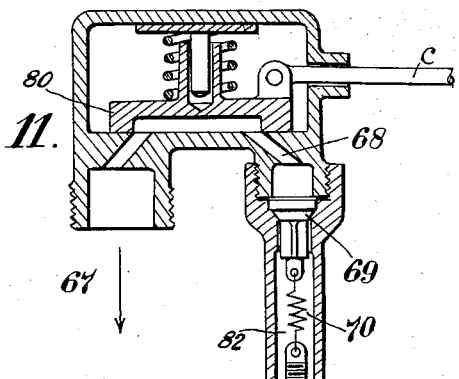
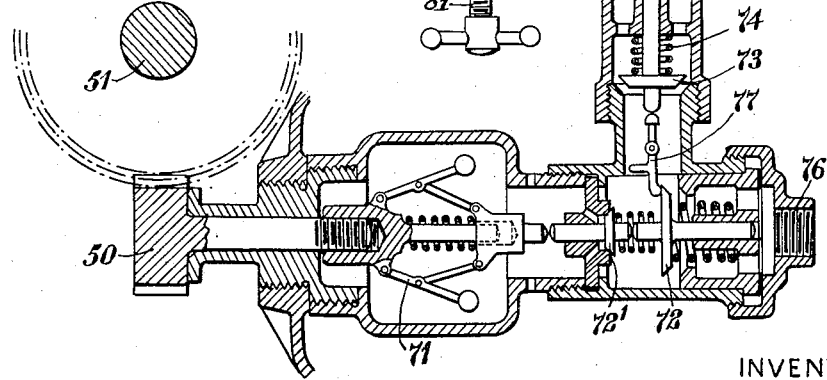

Patented June 16, 1931

1,810,763

UNITED STATES PATENT OFFICE

PAUL HALLOT, OF PARIS, FRANCE

SERVO-BRAKE

Application filed July 6, 1927, Serial No. 203,847, and in Belgium July 7, 1926.

The invention relates to a fluid controlled servo-brake having a minimum of parts, which is capable of exerting on automobile vehicles a rapid and maximum braking effort, and more generally, the most effective braking of all members or apparatus in movement, such as vehicles of all kinds, elevators, machine tools etc.

In known apparatus of this nature already patented by the same inventor for new applications to the automobile industry, the braking effort results from an inequality of pressures exerted on the two faces of a piston which moves in a cylinder, these pressures being produced either by liquid or gaseous fluid, the admission of which into the cylinder is regulated by a distributor.

A characteristic of the invention consists in the fact that the effort of the piston is transmitted to the apparatus controlling the brake gear, through the medium of pulley tackle or the like contrivance, but in combination with all the well-known characteristic arrangements which have been the essential fundamentals of all fluid actuated servo-brakes described by the applicant since 1913, notably in the French Patent No. 474,518 and its addition No. 22,635, as well as their improvements (French Patents No. 554,100 and No. 573,705) in view of coupling with the complementary action of vacuum, compressed air and other fluid actions on all pistons (or diaphragms), the direct action of the pedal on the gear, so as to augment insufficient braking effort by the pedal in heavy and rapid vehicles and to limit on all vehicles the effort to be exerted by the driver.

The effect thus produced is capable of attaining very high values, but a reduction valve is provided which can be optionally inserted in the admission pipe system, for automatically cancelling all excess pressure which would tend to lock the wheels—an indispensable feature for safe braking.
Moreover the invention permits of the application of an apparatus for automatically taking up play or wear, composed of a screw, a nut and a movable part acting as a ratchet in relation to the nut.

The control apparatus of the distributor and of the gear is characterized by the use of a lost motion connection mounted on a spindle and capable of complete control over the gear, assuring moderate braking effort and, in case of necessity, exerting on the gear a direct effort, independent of that produced by the fluid.

Furthermore, the piston of the distributor is ground at its two ends and thus acts as a hermetic valve for the fluid, when, in its end positions, it rests on the seats which limit its stroke.

In order to set forth the characteristics and advantages of the invention, a particular form of construction applied to the braking of an automobile is hereinafter described.

In the accompanying drawings, Figure 1 is a sectional view of the apparatus on the line 1—1 of Figure 4.

Figure 2 is an end view along the line A—A of Fig. 1.

Figure 3 is a detail view, showing the mounting of a control member.

Figure 4 is a plan view of the apparatus.

Figure 5 shows diagrammatically the complete equipment mounted on the chassis of an automobile.

Figure 7 is a complete view of this automatic regulating valve.

Figures 8, 9, 10 and 11 are alternative forms of construction of fluid pressure regulating devices.

Figures 12 and 13 show enlarged views of the device for taking up play in the brake rigging.

Figure 6:
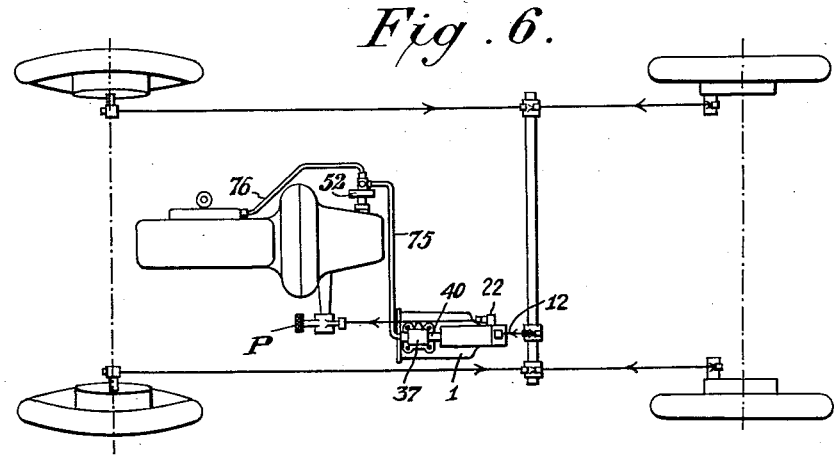
Figure 6 is a complete view of a reduced pressure servo-brake fitted with an automatically acting valve for reducing the pressure.

In Figures 1–5 1 denotes a casing, comprising a cylinder 2 in which moves a piston 3 provided with rings 4. A spindle 5 is bolted in the centre of the piston and on the spindle is mounted a swivel-hook 6 connected to a chain 7 which passes over a sprocket wheel 8, which can rotate at the end of the forked lever 9. The end of the chain is fixed on a pin 10, fixed to the casing 1. The lever 9 is loosely mounted on a spindle 11 crossing the casing 1, and controls the rod 12, which is connected to the brake gear (Figure 5) through the medium of a system for taking up play or lost motion. This rod 12 (Figure 1) which is prevented from turning, passes through a pin 13 which bridges the two arms of the fork of the lever 9 and terminates in a screw 14 on which a nut 15 is threaded, one end of which rests on the pin 13 through the medium of a collar 16. On the nut 15 is loosely mounted a sleeve 17 with serrated teeth on one of its end faces, held in position by a spring 18, the teeth of the sleeve being in engagement with similar teeth of a collar 19 fixed on the nut 15. The sleeve 17 carries two fingers 20 embracing a ball 21 which is firmly connected to the lever 9. This arrangement for taking up play is shown enlarged in Figs. 12 and 13 and its method of operation will be described later.

The spindle 11 (Figure 2) carries a lever 22 arranged outside the casing 1 and connected to the brake pedal (Figure 5).

The lever 22 through the medium of the spindle 11 controls a sleeve 23 carrying an actuating member 24 on which is mounted a small lever 25; the part 24 engages in a suitable slot 26 (Figures 2 and 3) of the sleeve of the lever 9.

The lever 25 (Figure 1) controls, by means of a connecting rod 27, a member 28 fixed to a sleeve 29, which itself controls, through the medium of a spring 30, a train of two valves 31 and 32 which are interconnected by a pin 33, mounted on the tail end of valve 31 and capable of being displaced several millimetres in a slot 34, formed in the tail of the valve 32. A spring 35 is placed between the valves 31 and 32. The seat of the valve 31 is situated on a piston 36 the displacement of which is limited to the interior of the cylinder 37 forming a part of the distributor chamber. When at rest the piston 36 is held in a position towards the left by a spring 38. The end of the cylinder 37 is connected by a pipe 39, either to the admission pipe system of the motor or to a regulator which is itself connected to the admission pipe system.

A casing 40 screwed on to the cylinder chamber 37 is provided with an orifice 45 (Figure 4) opening to the free air. The casing 40 carries a closing bush 41 which holds a spring 42, adapted to restore the apparatus to normal.

The orifice 43 connects the chamber 44 of the distributor with the cylinder 2. Lugs 46 and 47, cast solid with the casing 1 serve for fixing the apparatus. A hole 48 (Figure 1) furnished with a wire guard 49 permits the air in the casing 1 to pass in and out during the displacements of the piston 3.

The apparatus being thus constructed and controlled, if the brake pedal P or operating member is pushed, the latter actuates the lever 22 which turns the spindle 11, the sleeve 23 and the lever 25 in the direction of the arrow. The lever 25 pulls the member 27, which effects the displacement of the part 28, the sleeve 29, the valve 31, and the pin 33 towards the right. When the valve 31 rests on its seat, the piston 36 is drawn in its turn towards the right, and the pin 33 having arrived at the end of the slot 34, the valve 32 leaves its seat.

At this moment the valve 31 having closed all communication between the valve chamber 44 and the exterior by way of 45, and the valve 32 having left its seat, the admission pipe system 39 comes into communication with the chamber 44 and thus with the cylinder 2, by way of the port 43. The air enclosed in the cylinder 2 is exhausted by the admission pipe system. When, however, the reduction in pressure in the cylinder attains a certain value, the piston 36, urged on one side by the atmospheric pressure and on the other by the reduced pressure existing in the cylinder, moves towards the left, compressing the spring 30. In this movement the valve 32 returns again on its seat and closes all communication with the admission pipe system. The reduction in pressure then ceases to increase in the interior of the cylinder and keeps the value already attained.

If the pressure on the pedal P is increased the same actions are repeated and the value of the reduction in pressure in the cylinder increases in proportion as the movement of the pedal is increased, and proportionally to the compression of the spring 30. When the pedal is allowed to return to the position of rest, the members take up again the position indicated by the drawings, the valve 32 closes communication between the cylinder 2 and the admission pipe system 39, and the valve 31 opens, permitting air from the chamber 40 to reenter the cylinder 2. It is necessary to remark that the two extreme faces of the piston 36 being ground on assembly against the abutments of the casings 37 and 40, which limit its movement, the left face of the piston engaging at rest on the abutment of the casing 37, acts as a valve opposing the reentrance of exterior air into the valve chamber 44 and thus into the cylinder 2. The same remark applies when the distributor is fully open; at this moment it is the right face of the piston which rests on the abutment of the casing 40 and acts, in its turn, as a valve.

The guides of the valves 31 and 32 are preferably cross-shaped in section. The distributor, thus constructed, permits of obtaining in the cylinder 2 all values of reduced pressure according to the distance through which the brake pedal has been depressed.

As soon as the reduction in pressure commences in the interior of the cylinder 2, the piston 3 is displaced towards the left and pulls on the chain 7 which draws in its turn the lever 9 through the medium of the sprocket wheel 8. The lever 9 then actuates the rod 12 which is connected to the brake gear and transmits to it an effort which is a function of the value of the reduction in pressure existing in the cylinder 2.

The system for taking up play, fixed at the extremity of the pull rod 12 will now be described with particular reference to Figures 12 and 13. The movement of the lever 9 about the pivot 11, in its displacement towards the left (arrow $x$) produces an upward movement of the ball 21 (arrow $y$). The latter causes the two prongs 20, which are fixed to the toothed sleeve 17, to move with it. The sleeve 17 is thus turned angularly about the axis of the system without moving the toothed collar 19, the sloping parts of the teeth sliding over each other. When the movement of the lever 9 has reached a certain amplitude, determined by the constructor, the toothed sleeve 17 has turned a sufficient amount to overstep the space of one tooth on the collar 19. To overstep this tooth, the sleeve 17 has in the first place during its rotation moved back in relation to the collar 19 and then falls into the recess of the teeth under the action of the spring 18; in the return movement towards the right of the lever 9 the ball 21 draws the prongs 20 downwards. Thus the sleeve 17, engaging with its teeth in those of the collar 19 draws the latter and the nut 15 in its rotary movement. The nut 15 thus screws itself a fraction of a turn on the screw 14, and from the fact that it rests through the medium of the collar 16 against the spindle 13, causes the pull rod 12 to move towards the left an amount corresponding to that which the nut 15 has been screwed.

It is seen from the above that when the movement of the lever 9 reaches a maximum on account of the play produced by wear of the brake rigging, this latter is taken up automatically by the system. This feature has the advantage in the construction of permitting the provision of cylinders of reduced length, and by this, of diminishing the quantity of air absorbed by the admission pipe system, and of dispensing with brake setting. It can easily be seen that such a system of braking permits of large braking efforts being obtained with minimum pressures by the foot on the pedal.

For reasons of safety it is necessary that the brakes should not only be controllable by the servo means but also be controllable directly by the driver, so that, in case the exhausting system does not function, the driver can, nevertheless, stop his vehicle by a direct effort exerted on the gear. For this purpose, when the lever 22 moves the sleeve 23 (Figure 2) and the part 24, this latter does not immediately have any effect upon the sleeve of the lever 9 (Figure 3). The slot 26 formed in the sleeve of the lever 9 allows the piece 24 a certain amount of movement which permits the first movements of the distributor. Under the impulse of the piston 3 the lever 9 comes into a working position by turning about the spindle 11 in the direction of the arrow, but it has no influence on the lever 25. This permits of moderate effort of braking.

If for some reason, however, the piston 3 does not function, the part, 24, after a very slight movement, engages with the sleeve of the lever 9, operating the gear, and a direct effort is thus exerted on the brake gear.

It will be understood that the constructional form of the invention just described is only by way of example, and all modifications of the invention which do not alter the principle come within its scope.

The apparatus can also be coupled with any kind of control system of brake gear as well as, when necessary, with any brake regulating device for avoiding the locking of the wheels.

To this end, in combination with the parts above described, use is made of an apparatus for the regulation of the pressure, inserted in the admission pipe system, which is put in control by the rotary movement of the wheels, such as represented by 52 (Figs. 6 and 7), the control pinion 103 receiving its rotary movement from a shaft 102 of the gear box.

Fig. 7 shows the device in detail. In this figure a worm 101 keyed to the secondary shaft 102 of the speed gear box (or on any other shaft in constant connection with the rear wheels) drives a helicoidal pinion 103 secured to a screw 104 with a steep pitch which carries a nut 105 to which is secured a fly wheel 106. The nut 105 may move with slight friction on the screw 104, but its movement is limited by a stop 107 mounted on the screw 104, this stop coming into contact with the edges of a notch 108 cut in the screw 105.

A central pin 109 screwed into the end of the nut 105 may engage the stem of a valve 110 held on its seat 111 by a spring 112 bearing at one end on the seat 111 and at the other end on a cup 113 secured to the stem of the valve 110. The seat 111 carries a member 114, provided with holes 115, serving as a guide for the valve 110.

Another valve 116, which is normally held from its seat 117 by the action of a spring 118, may be operated by the valve 110 through the medium of a spring 119.

The chamber for both valve 110 and 116 is formed, on the one hand, by a member 120 carrying a screw thread boss 121 which may be connected to the brake cylinder (Figure 6) by a pipe 75, and, on the other hand, by a plug 124 provided with a screw threaded boss 125 which may be connected, by means of a pipe 76, to the induction pipe system of the engine.

All the rotating parts of the apparatus are enclosed in a casing 131 formed of a number of parts, this casing 131 being itself screwed to a boss 132 of the speed gear box.

When the vehicle moves forwardly the pinion 103 drives the screw 104 in the direction of the arrow, the screw 104 in turn driving the nut 105 and the fly wheel 106 and this latter, by reason of its inertia, causes the nut 105 to screw to the end of the screw 104 until the larger face of the notch 108 is in contact with the stop 107. The whole system is then in the position shown.

If pressure is applied to the brake pedal P the distributor is opened, the air from the brake cylinder is drawn through the pipe 75, passes between the valve 116 and its seat 117, then through the pipe 76, and finally into the induction pipe of the engine. When the vacuum becomes too great in the cylinder, the rear wheels tend to jam, the pinion 103 and consequently the screw 104 tend to stop. But the nut 105 and the fly wheel 106 having stored kinetic energy move along a helicoidal path. This movement causes the nut 105, the fly wheel 106 and the pin 109 to move from the left to the right. The pin 109 pushes the valve 110 and 116 towards the right. The valve 116 interrupts communication between the suction pipe and the brake cylinder. The valve 110 being thus opened, a certain quantity of air passes through the holes 133 and 115 and enters the brake cylinder. When this admission of air is sufficient so that the vacuum existing at this moment in the cylinder enables the wheels to again turn, the pinion 103 and the nut 104 again take up the speed at the moment and by inertia the nut 105 and the fly wheel 106 return to their initial position. Consequently the valve 110 returns to its seat 111 and the admission of air ceases. On the other hand the valve 116 remains on its seat as the spring 118 is such that it cannot balance the difference of pressures existing, at this moment, on two faces of the valve 116.

If jamming again tends to occur the same operations are repeated and the valve 110 allows the necessary quantity of air to enter to effect the release. It thus follows that the stopping is effected without jamming or skidding of the rear wheels.

Figures 8, 9, 10 and 11 show, by way of example, some alternative constructions of the device shown in Figure 7.

Figure 8:
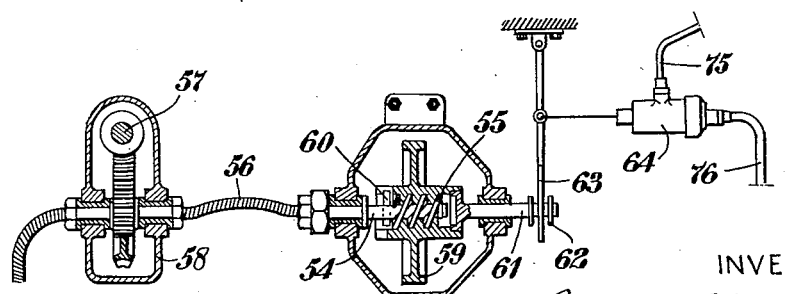

In Figure 8 the regulator comprises a shaft 54, threaded into 55 which is controlled by a flexible coupling 56, actuated by a train of gear wheels 57, controlled by a flexible coupling from the tachometer by means of an interposed distribution box 58.

The rotation of the shaft 54 determines the displacement of the nut 59 of the threaded flywheel until it meets the spur 60 (in the case of the figure). If the wheels suddenly reduce their speed of rotation on account of locking, the flywheel 51, being displaced by inertia towards the right, draws with it the shaft 61 which carries the flanged ring 62, which acts on the fork 63 controlling the fluid pressure reduction apparatus 64, whatever it may be (suitable slide valves such as that of Figure 11).

As soon as the wheel begins to rotate again, the flywheel is moved back to the left and is ready to act in the event of wheel locking occurring again.

In Figure 9 the same principles of operation are employed except that the shaft 65 and the fork 66 move through the medium of any device acting by centrifugal force, such a device as that shown in Figure 11.

These two methods of regulation are represented diagrammatically in order to show that the invention is independent of the forms and details of construction of the apparatus.

In Figure 10 the regulator is operated, in the same way as the regulator in Figure 7, by a pinion 50, receiving its movement from a shaft 51 of the gear box. The centrifugal regulator 71 acts on a train of valves 72 and 72′ of the same kind as that of the regulator of Figure 7. A valve 73 is also provided which is acted on by a spring 74 and located in the orifice 75 connected to the servo-brake, the orifice 76 being connected to the admission pipe system. In normal operation, as shown in the figure, the valve 73 is raised from its seat by the double lever 77 controlled by the valve 72, which permits the air to be exhausted from the servo-brake at the moment of braking. If there is wheel lock, the regulator 71 stops, the valve 72′ lifts and allows air to pass, at the same time as the valve 72 closes, and as the valve 73 falls back on its seat. The difference of pressure existing on the faces of the valve 73 will then lift this latter causing the admission of air to the brake cylinder and, according to the tension of the spring 74, the minimum value of reduced pressure in the servo-brake may be adjusted to any desired value.

Figure 11 shows a detailed view of a suitable form of the pressure reduction apparatus 64, shown in Figure 8. In this figure the brake cylinder is connected to the pipe 67. The valve 80 is spring-pressed against the port face, and is moved by the rod C which is, in its turn, operated by the forked lever 63 (Fig. 8). 69 is a valve which is held closed by the spring 70, the tension of which can be varied by adjusting the screw 81. The chamber 82 is open to the atmosphere so that, when the rod C is moved due to the locking of the wheels, and the port 68 is uncovered, the difference of pressure on the two sides of the valve 69 causes this latter to lift and reduce the vacuum in the brake cylinder, in the same manner as described with reference to Figure 7.

I claim:—

1. A servo-brake comprising the combination of a brake gear, a brake rod connected to said brake gear, a cylinder, a piston in said cylinder, a lever to which said brake rod is jointed, a pulley mounted on said lever, connective means passing round said pulley having one end connected to said piston and the other end connected to a fixed point, and means for creating a difference in fluid pressure in said cylinder on the two sides of said piston.

2. A servo-brake comprising the combination of a brake gear, a brake rod connected to said gear, a cylinder, a piston in said cylinder, a lever pivoted on a spindle, a sprocket wheel mounted on said lever, a chain fastened at one end to the piston and at the other end to a fixed point of the apparatus and passing round said sprocket wheel, and means for creating a difference in fluid pressure in said cylinder on the two sides of said piston.

3. A servo-brake comprising the combination of a brake gear, a brake rod connected to said brake gear, a lever mounted on a stationary pivot to which said brake rod is jointed intermediate the pivot and its free end, means between said brake rod and said lever for taking up lost motion, a sprocket wheel on the free end of said lever, a chain connected at one end to said piston and at the other end to a fixed point and means for creating a difference in fluid pressure in said cylinder on the two sides of said piston.

4. A servo-brake comprising the combination of a casing, a cylinder forming part of said casing, a piston in said cylinder, a spindle, a lever pivoted on said spindle, a brake rod jointed to said lever, means between said brake rod and said lever for taking up lost motion, a sprocket wheel mounted on said lever, a chain mounted on said sprocket wheel having one end secured to said piston and the other end to a fixed point of said casing, and a distributor controlling the flow of fluid to and from said cylinder.

5. A servo-brake comprising the combination of a casing, a cylinder forming part of said casing, a piston in said cylinder, a spindle journalled in said casing, an operating crank arm secured to said spindle, a forked lever pivoted on said spindle, a pulley mounted in the forked end of said lever, connective means mounted on said pulley and connected at one end to the piston and at the other end to a fixed point of said casing, a brake rod jointed to said lever intermediate said pulley and said spindle, a distributor mounted on said casing, passages from said distributor to said cylinder to a source of reduced pressure and to the atmosphere and connective means provided with lost motion between said operative crank arm and said lever which permits the brake rod to be moved directly by said crank arm should the distributor and piston become inoperative.

6. A servo-brake comprising the combination of a casing, a cylinder forming part of said casing, a piston in said cylinder, a spindle journalled in said casing, an operating crank arm secured to said spindle, a lever pivoted on said spindle, a pulley mounted on said lever, connective means mounted on said pulley and connected at one end to the piston and at the other end to a fixed point of said casing, a brake rod jointed to said lever intermediate said pulley and said spindle, connective means provided with lost motion between said operative crank arm and said lever, which permits the brake rod to be moved directly by said crank arm should the distributor and piston become inoperative, a hollow cylinder distributor chamber mounted on said casing, passages from said distributor chamber to the first aforesaid cylinder to a source of reduced pressure and to the atmosphere, a distributor piston inside said distributor chamber, a pair of valves coaxial with said piston one seated on the piston the other on the distributor chamber, and connective means from said valves to the operating crank arm aforesaid.

7. A servo-brake comprising the combination of a casing, a cylinder forming part of said casing, a piston in said cylinder, a spindle journalled in said casing, an operating crank arm secured to said spindle, a lever pivoted on said spindle, a pulley mounted on said lever, connective means mounted on said pulley and connected at one end to the piston and at the other end to a fixed point of said casing, a brake rod jointed to said lever intermediate said pulley and said spindle, connective means provided with lost motion between said operative crank arm and said lever, which permits the brake rod to be moved directly by said crank arm should the distributor and piston become inoperative, a distributor chamber comprising two hollow cylinders fastened together, and mounted on said casing, passages from said distributor to said cylinder to a source of reduced pressure and to the atmosphere, a distributor piston inside one of said hollow cylinders, an internal abutment on each hollow cylinder which serves as a valve seat limiting the movement of the piston in one direction, and connective means from said valve to the operating crank arm aforesaid.

8. A servo-brake comprising the combination of a casing, a cylinder forming part of said casing, a piston in said cylinder, a spindle journalled in said casing, an operating crank arm secured to said spindle, a lever pivoted on said spindle, a pulley mounted on said lever, connective means mounted on said pulley and connected at one end to the piston and at the other end to a fixed point of said casing, a brake rod jointed to said lever intermediate said pulley and said spindle, connective means provided with lost motion between said operative crank arm and said lever, which permits the brake rod to be moved directly by said crank arm should the distributor and piston become inoperative, a distributor chamber comprising two hollow cylinders fastened together and a distributor piston inside one of the said hollow cylinders, an internal abutment on each hollow cylinder which serves as a valve seat limiting the movement of the piston in one direction, a sleeve inside distributor chamber connected to the operating crank arm aforesaid, a valve seated on said distributor piston and having its stem guided inside said sleeve, a second valve seated on the distributor chamber and loosely connected to the first said valve, a compression spring between the two said valves, a compression spring between the distributor piston and said sleeve, a compression spring between said sleeve and the end of the said valve stem, and a compression spring between said sleeve and a detachable cap at the end of the distributor chamber.

9. A servo-brake comprising the combination of a casing, a cylinder forming part of said casing, a piston in said cylinder, a spindle journalled in said casing, an operating crank arm secured to said spindle, a lever pivoted on said spindle, a pulley mounted on said lever, connective means mounted on said pulley and connected at one end to the piston and at the other end to a fixed point of said casing, a brake rod jointed to said lever intermediate said pulley and said spindle, connective means provided with lost motion between said operative crank arm and said lever, which permits the brake rod to be moved directly by said crank arm should the distributor and piston become inoperative, a distributor chamber comprising two hollow cylinders fastened together and a distributor piston inside one of the said hollow cylinders, an internal abutment on each hollow cylinder which serves as a valve seat limiting the movement of the piston in one direction, a sleeve inside distributor chamber connected to the operating crank arm aforesaid, a valve seated on said distributor piston and having its stem guided inside said sleeve, a second valve seated on the distributor chamber and loosely connected to the first said valve, a compression spring between the two said valves, a compression spring between the distributor piston and said sleeve, a compression spring between said sleeve and the end of the said valve stem, and a compression spring between said sleeve and a detachable cap at the end of the distributor chamber, a passage from the distributor to the cylinder, a pipe connection from the distributor to a source of reduced pressure, and a passage from the distributor to the atmosphere.

10. A servo-brake comprising the combination of a casing, a cylinder forming part of said casing, a piston in said cylinder, a spindle journalled in said casing, a lever having a sleeve surrounding said spindle, a pulley mounted on said lever, connective means passing round said pulley and connected at one end to said piston and at the other end to a fixed point of said casing, a brake rod jointed to said lever, a distributor mounted on said casing, for controlling the admission and exhaust of fluid from said cylinder, a collar secured on said spindle having a crank arm pivoted to said distributor and a second operative crank arm and means whereby said collar after a predetermined movement engages said sleeve to operate said brake rod positively.

11. A servo-brake comprising the combination of a casing, a cylinder forming part of said casing, a piston in said cylinder, a spindle journalled in said casing, a lever having a slotted sleeve pivoted on said spindle, a pulley mounted on said lever, connective means passing round said pulley and connected at one end to said piston and at the other end to a fixed point of said casing, a brake rod jointed to said lever, a distributor mounted on said casing for controlling the admission and exhaust of fluid from said cylinder, a collar on said spindle having a crank arm pivoted to said distributor and an operating crank arm and a tongue projecting into the slot on said sleeve, said slot being wider than said tongue.

12. A servo-brake comprising the combination of a casing, a cylinder forming part of said casing, a piston in said cylinder, a spindle journalled in said casing, a lever having a slotted sleeve pivoted on said spindle, a pulley mounted on said lever, connective means passing round said pulley and connected at one end to said piston and at the other end to a fixed point of said casing, a brake rod jointed to said lever, a distributor mounted on said casing for controlling the passages connecting said cylinder with atmosphere and a source of reduced pressure respectively, a collar secured on said spindle having a tongue loosely cooperating with said slotted sleeve and two crank arms, one crank arm being connected to said distributor and the other being an operating crank arm and a system for automatically taking up wear of the parts connected between said brake rod and said lever.

13. A servo-brake comprising the combination of a casing, a cylinder forming part of said casing, a piston in said cylinder, a spindle journalled in said casing, a lever having a slotted sleeve pivoted on said spindle, a pulley mounted on said lever, connective means passing round said pulley and connected at one end to said piston and at the other end to a fixed point of said casing, a distributor mounted on said casing for controlling the admission and exhaust of fluid to and from said cylinder, a collar secured on said spindle having an operating crank and a second crank arm pivotally connected to said distributor, said collar being adapted to engage said sleeve after a predetermined movement, a brake rod jointed to said lever, said brake rod having a screw-threaded extended portion beyond said joint, a nut on said screw-threaded portion abutting on said lever, and a sleeve on said nut with serrated teeth engaging under spring pressure with serrated teeth on said nut, said sleeve having a fork engaging with a projection from said lever.

In testimony whereof I have hereunto affixed my signature.

PAUL HALLOT.